UNITED STATES PATENT OFFICE.

WILLIBALD GELINEK, OF MERZDORF, AUSTRIA-HUNGARY.

PROCESS OF MANUFACTURING SOLID SUBSTANCES FROM FIBROUS MATERIAL AND PRODUCT THEREOF.

SPECIFICATION forming part of Letters Patent No. 662,929, dated December 4, 1900.

Application filed July 30, 1900. Serial No. 25,340. (No specimens.)

*To all whom it may concern:*

Be it known that I, WILLIBALD GELINEK, a subject of the Emperor of Austria-Hungary, residing at Merzdorf, near Bodenbach, Bohemia, Austria-Hungary, have invented certain new and useful Improvements in Processes of Manufacturing Solid Substances from Fibrous Material and the Product Thereof; and I do hereby declare the following to be a full, clear, and exact description of the invention, such as will enable others skilled in the art to which it appertains to make and use the same.

In spite of many experiments and conflicting assertions a cheap impregnating substance has not hitherto been obtainable by means of which fibrous substances—such as cellulose, sawdust, spinners' waste, and the like—can be converted into a hard homogeneous material which cannot only be turned, cut, and rasped, but which fully resists the action of cold and hot water without becoming soft and which finally may be recommended as a cheap means of replacing vulcanite and the like compositions for many insulating purposes. The production of such a material is divided into two parts—first, the production of the impregnating substance, and, second, the treatment of the same with its fibrous material.

*Part 1.*—This impregnating substance consists of a mixture of coal-tar, colophony, asbestos, kaolin, infusorial earth, and lime. I would expressly draw attention to the fact that the successful action of this substance does not merely depend upon the liquid tar being solidified by means of the resinous lime on the one hand and by means of suitable minerals on the other hand; but only by the selection of a special silicate can a substance be obtained which will afterward combine with the fibrous material to form a thoroughly useful and workable material.

Example: Commercial coal-tar is freed from moisture and the volatile hydrocarbons by a long heating at about 140° centigrade. Sixty-three per cent. of this tar is then treated with 16.5 per cent. colophony and eight per cent. slaked lime, after which 5.5 per cent. ground asbestos, 2.5 per cent. kaolin, and 4.5 per cent. infusorial earth (the several proportions being by weight) are added. These materials are preferably mixed with the tar at a temperature up to 140° centigrade.

*Part 2.*—The substance thus obtained is treated at 140° to 150° centigrade, with approximately an equal weight of pulverized fibrous material (sawdust, ground wood, cellulose, or the like) and thoroughly incorporated therewith. The resultant plastic mass as hot as possible is then forced under high pressure into metal molds, wherein after cooling it forms a solid homogeneous mass, in which the structure of the fibrous substances is not recognizable with the naked eye and which may be used in the same way as hard rubber.

Both operations 1 and 2 may, if desired, be combined by slowly adding the fibrous material to the impregnating substance immediately after it has been mixed and incorporated and by continuing the kneading until the substance is sufficiently prepared for the press.

I declare that what I claim is—

1. The process for the manufacture of compressed or solid substances which consists in first preparing an impregnating substance of coal-tar, colophony, asbestos, kaolin, infusorial earth and lime, then mixing this with fibrous material, and while hot, compressing the plastic mass thus obtained, under high pressure, substantially as described.

2. A composition for the manufacture of a compressed or solid substance consisting of fibrous materials, with coal-tar, colophony, asbestos, kaolin, infusorial earth and lime, substantially as described.

In testimony whereof I affix my signature in presence of two witnesses.

WILLIBALD GELINEK.

Witnesses:
LEOPOLD GERZNER,
GUSTAV POPPENBERGER.